United States Patent [19]

Petersen

[11] 3,788,670
[45] Jan. 29, 1974

[54] CAMPING UNIT

[76] Inventor: Raymond N. Petersen, c/o Petersen Welding & Construction Co., 346 North 6th Street, Forest City, Iowa 50436

[22] Filed: Nov. 12, 1971

[21] Appl. No.: 198,137

[52] U.S. Cl.............. 280/203, 296/23 A, 296/23 G
[51] Int. Cl............................................. B62k 27/00
[58] Field of Search......280/203; 296/23 R, 23 A, 296/23 G, 23 H, 27

[56] References Cited
UNITED STATES PATENTS

| | | | |
|---|---|---|---|
| 2,057,197 | 10/1936 | Liptay | 280/203 |
| 1,379,655 | 5/1921 | Stettler | 280/203 |
| 1,276,388 | 8/1918 | Marx | 296/23 A |

FOREIGN PATENTS OR APPLICATIONS

| | | | |
|---|---|---|---|
| 1,927,406 | 12/1970 | Germany | 296/23 A |

*Primary Examiner*—Gerald M. Forlenza
*Assistant Examiner*—John Mannix
*Attorney, Agent, or Firm*—Robert W. Gutenkauf et al.

[57] ABSTRACT

A camper unit attachable to the side of a motorcycle. The unit includes a camping portion mounted on a frame portion attachable to the side of a motorcycle. The floor of the camping portion is comprised of a plurality of panels hingedly connected which fold together to form a box-like structure for transport to and from a camping location. The hinges connecting the panels are mounted in grooves provided in the ends of the respective connected panels for strength and obscurity. A tent provides the shelter for the camping portion. Jointed tent poles serve also as support members for the floor. Removable legs are provided for further floor support. A portion of the floor is supported by the wheel attached to the frame. Hitch means connecting the camper unit to the motorcycle is adjustable whereby the camper unit may be attached to a wide variety of motorcycles of different manufacture and model. The camper unit is adaptable to be trailed behind a snowmobile or a small automobile.

15 Claims, 18 Drawing Figures

PATENTED JAN 29 1974 3,788,670
SHEET 1 OF 3
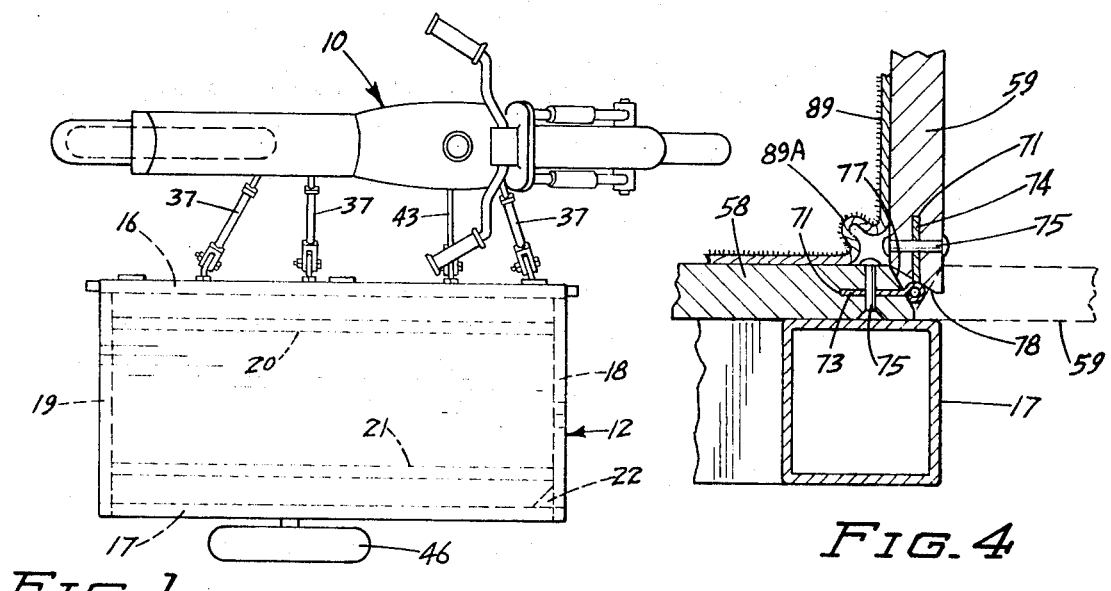
FIG. 1
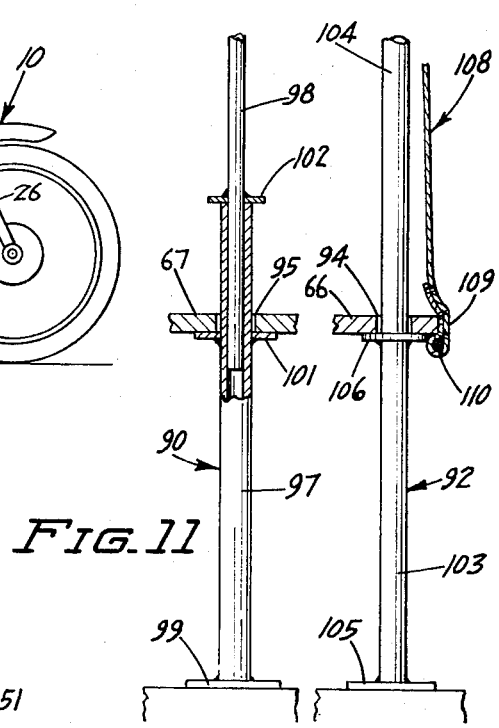
FIG. 4
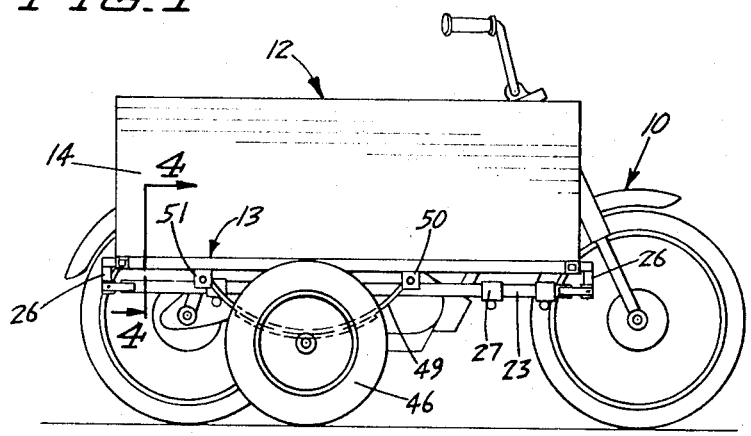
FIG. 2
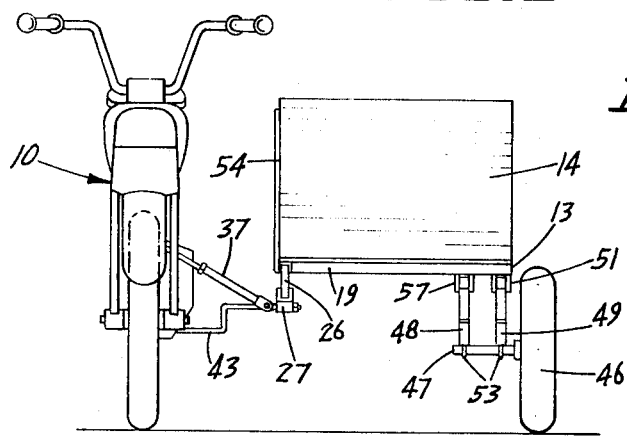
FIG. 3
FIG. 11
FIG. 12
INVENTOR.
RAYMOND N. PETERSEN
BY
Burd, Braddock & Bartz
ATTORNEYS

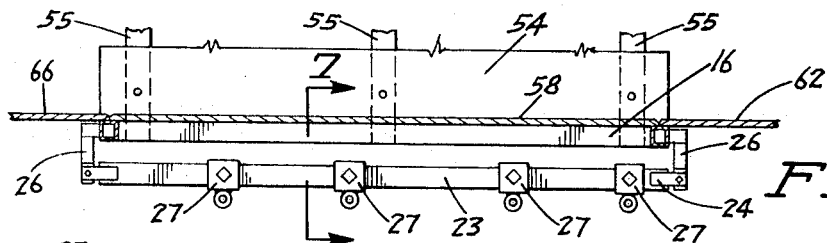
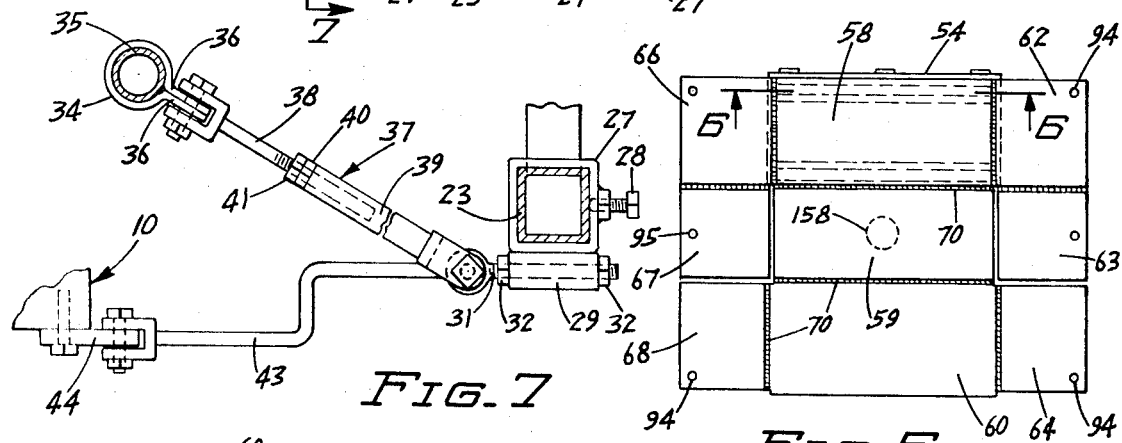
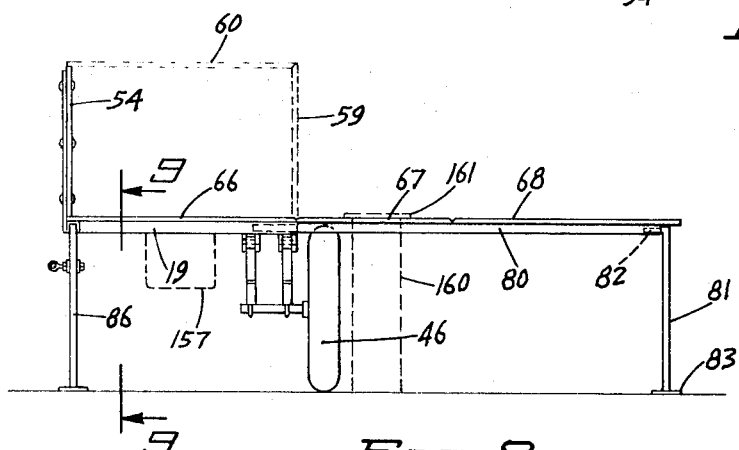
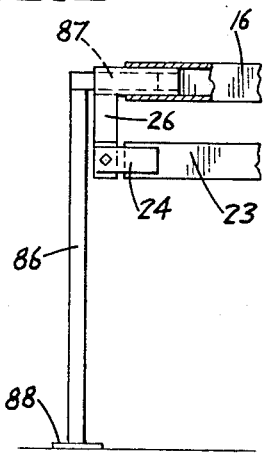
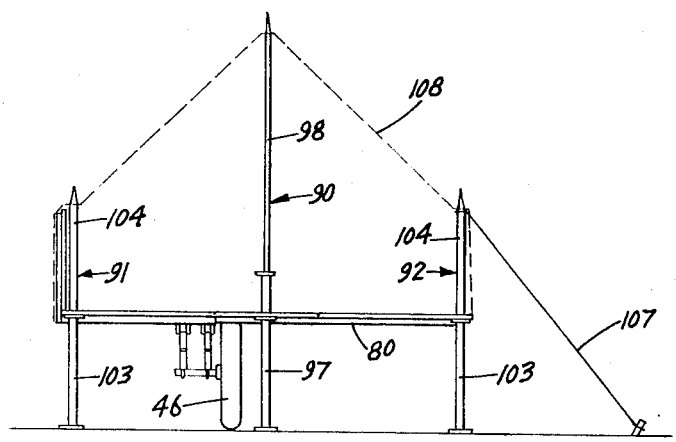

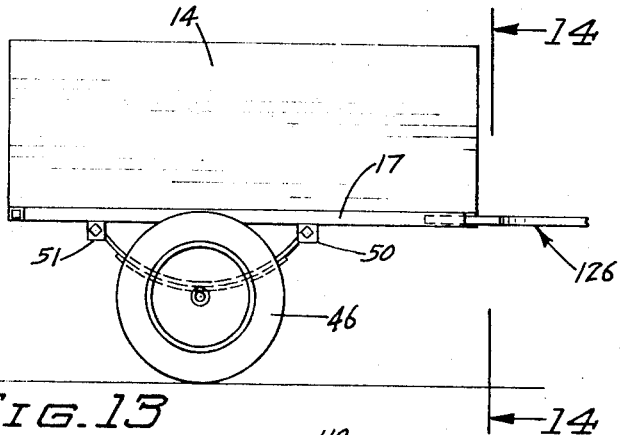
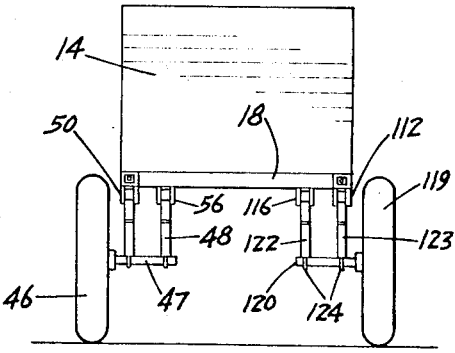
Fig.13  Fig.14
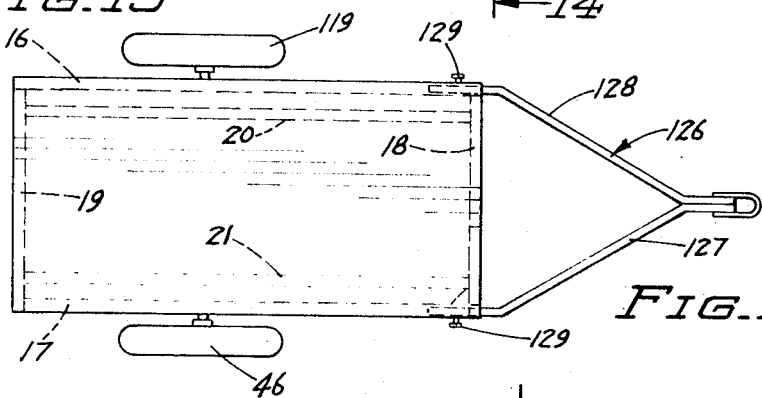
Fig.15
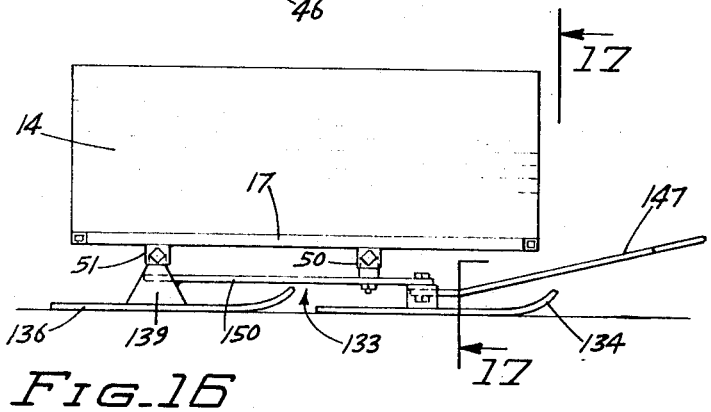
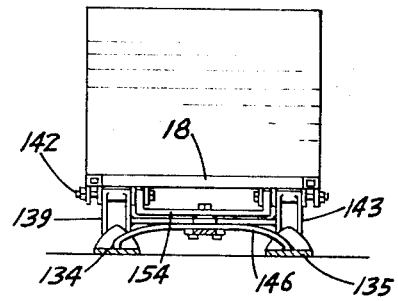
Fig.16  Fig.17
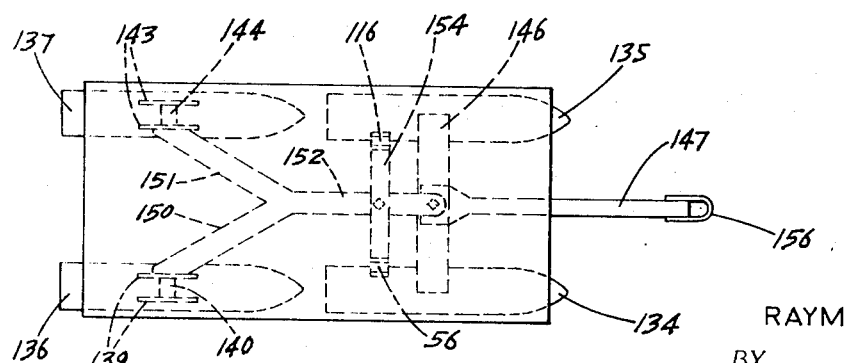
Fig.18
INVENTOR
RAYMOND N. PETERSEN
BY
Burd, Braddock & Barty
ATTORNEYS 3,788,670

1

CAMPING UNIT

BACKGROUND OF THE INVENTION

For many years camping has been a popular leisure-time activity. In recent years camping has become more sophisticated and, on a pleasant weekend, it is not uncommon for one to observe on the highways a great number of so-called camping trailers in tow behind automobiles and trucks, traveling to and from various camping destinations. For an example of such a camping trailer having fold-out side walls to form a floor, see U. S. Pat. No. 3,149,876 to Melbye. Motorcyclists, also, frequently enjoy camping. The cyclist must compactly pack his camping gear, such as a sleeping bag, a tent, and the like, for fastening to the motorcycle. Only a limited amount of camping equipment may be carried in such a fashion. It is difficult for more than a single person to ride the motorcycle when so packed. Side cars are available to motorcyclists, for example, as in U. S. Pat. No. 1,213,163 to Jaggard, which could be used to transport camping equipment. Such side cars are typically designed to fit a single model of motorcycle. Further, upon reaching the camping destination, they are of no assistance to the camper, as by providing shelter or a place to sleep.

SUMMARY OF THE INVENTION

The present invention relates to a camper unit for transporting with a motorcycle in side car fashion. The camper unit has adjustable hitch means whereby the unit may be hitched to motorcycles of a wide variety of manufacture and models, including so-called trail motorcycles as well as larger motorcycles. The unit includes a frame and a camping portion mounted on the frame. The camping portion has an upright side wall and a floor comprised of a plurality of hingedly connected panels which, in the closed or collapsed configuration, form a compact box structure for storing and transporting equipment. In the open or erect configuration, the panels form the rigid floor of the camping portion. Hinges connecting the various panels are installed in grooves provided in the sides of the various panels for strength and obscurity. A wheel is mounted on the side of the frame opposite the motorcycle. In the erect configuration the wheel assists in supporting the floor. Removable leg members are insertable into the ends of the frame members for additional support. The shelter of the camper portion, in the preferred embodiment, is constituted as a tent pitched on a plurality of tent poles. The tent poles are jointed, having a portion between the ground and the floor, offering support to the floor, and a telescoping upper portion. The camper unit is adapted to be fitted with skis or runners and a tongue and hitch to be towed behind a snowmobile. Additionally, a second wheel may be added for towing the camper unit behind a small automobile.

An object of the invention is to provide a spacious camper unit when in the erected configuration and which is collapsible into a compact structure for transporting. A second object of the invention is to provide a camping unit of the type described that may be hithced to and transported by a motorcycle. A further object of the invention is to provide a camper unit of the type described having a universal hitch for attachment to a wide variety of motorcycle models. A further object of the invention is to provide a camper unit of the type described having hingedly connected floor panels whereby the hinges are installed within the panels. Another object of the invention is to provide a camper unit of the type described adaptable to be towed by a snowmobile or a small automobile. Further objects of the invention will become apparent upon the following description.

IN THE DRAWING

FIG. 1 is a top view of the camper unit of the invention hitched to a motorcycle;

FIG. 2 is a side view of the camper unit and motorcycle of FIG. 1;

FIG. 3 is a front view of the camper unit and motorcycle of FIG. 1;

FIG. 4 is an enlarged sectional view of a portion of the frame and camping portion of the camper unit of the invention taken along the line 4—4 of FIG. 2;

FIG. 5 is a plan view of the floor portion of the camper unit;

FIG. 6 is an enlarged sectional view showing hitch means and a floor portion of the camper unit taken along the line 6—6 of FIG. 5;

FIG. 7 is an enlarged sectional view of the hitch portion and showing two connecting links, taken along the section line 7—7 of FIG. 6;

FIG. 8 is a rear elevational view of the camper unit of the invention showing the floor in the erect configuration;

FIG. 9 is an enlarged sectional view of a portion of the frame of the camper unit taken along the section line 9—9 of FIG. 8;

FIG. 10 is a rear elevational view of the camper unit of the invention in an erected configuration;

FIG. 11 is a plan view of a jointed center tent pole of the invention with portions broken away for purposes of illustration;

FIG. 12 is an elevational view of a jointed side tent pole of the camper unit of the invention;

FIG. 13 is a side view of the camper unit of the invention adapted to be trailed behind a small automobile;

FIG. 14 is a front view of the camper unit of the invention adapted to be trailed behind a small automobile, taken along the line 14—14 of FIG. 13;

FIG. 15 is a top view of the camper unit of the invention adapted to be trailed behind a small automobile;

FIG. 16 is a side view of the camper unit of the invention adapted to be trailed behind a snowmobile;

FIG. 17 is a front view of the camper unit of the invention adapted to be trailed behind a snowmobile, taken along the line 17—17 of FIG. 16; and FIG. 18 is a top view of the camper unit of the invention adapted to be towed behind a snowmobile, with an underlying sled structure shown in phantom.

DESCRIPTION OF THE PREFERRED EMBODIMENT

Referring to FIGS. 1 through 3, there is shown a motorcycle 10 of conventional style and design hitched to the camper unit of the invention in the closed or collapsed configuration for transport to and from a camping destination. The camper means includes a frame portion, indicated generally at 13, and a collapsible camper portion 14 mounted n the frame 13. Frame 13, shown in phantom in FIG. 1, is comprised of a plurality of hollow tubular members including inside and outside longitudinal members 16, 17 and front and rear lateral members 18, 19. The frame members have a square cross section, as shown in FIG. 4, and are fastened together, as by welding, in a rectangular configuration. A pair of longitudinal brace members 20, 21 are fastened between the front and rear members to add rigidity to the structure. The front and rear ends of the inside member 16 are open to telescopically receive a section of a connecting member. At the forward outside corner of the frame 13, the outside longitudinal member 17 and the front lateral member 18 are fastened together by a welded triangular gusset 22. Each of the members is foreshortened at the said corner, having open ends to alternately receive an inserted member. The outboard end of the rear member 19 is also open to telescopically receive an end section of a floor support member.

Camper unit 12 is coupled to the motorcycle 10 by the unique hitch means of the invention. A hitch assembly includes hitch bar 23 fastened beneath and parallel to the inside longitudinal frame member 16. Hitch bar 23, as best seen by FIG. 6, is a square elongated tubular bar having short outward plate-like extensions 24 at either end. To each of the extensions 24, one leg of an L-shaped connecting member 26 is bolted. The complementary leg of each L-shaped member 26 is telescopically positioned in the respective open ends of the inside frame member 16. Said complementary legs of the L-shaped members 26 have also a square, tubular cross section and are open for receipt of a portion of a leg member. The hitch bar 23 is thus firmly secured to the inside frame member 16.

Clamping means include a plurality of clamps 27 slidably engaging the hitch bar 23. As shown in FIG. 6, there are four such clamps, which number has proven to be adequate. A clamp 27, as best seen by FIG. 7, has a square open portion which engages the side walls of the hitch bar 23. By sliding, the clamp is adjustable to any longitudinal position on the hitch bar 23. A set screw 28 is threaded through a portion of the clamp 27 to contact the hitch bar. Tightening of the set screw 28 firmly secures the clamp in place. Attached to the bottom portion of the clamp 27 is a laterally disposed sleeve 29. Positioned in the sleeve 29 is a threaded eye bolt 31. Nuts 32 are threaded on the shank of the eye bolt at either end of the sleeve 29, firmly holding the eye bolt in position. The shank of the eye bolt is sufficiently long to allow lateral adjustment of the position of the eye by varying the position of the nuts 32 on the shank. Standard motorcycles are typically constructed on a framework of tubular members. For example, typically a structural member extends from beneath the handle bars downward to a position in the vicinity of the transmission. Another member may extend from the transmission mounting rearwardly to the rear wheel axle. Still another may extend from the rear wheel axle to the seat. According to the present invention, there are provided a plurality of flanged collars which are placed at selected locations on the tubular frame members of the motorcycle, for example, the collar 34 of FIG. 7, engaging a tubular section 35 of the motorcycle. In the present embodiment of the invention, three such collars are provided at selected locations on the motorcycle. The collar 34 closely engages the tubular section 35, and has mating flange sections 36. Each of the collars 34 is connected by link means shown as an adjustable length link 37 to one of the clamps 27. The adjustable length links 37 each include an elongated rod portion 38 and a mating body portion 39. Elongated rod portion 38 has a threaded shank section at one end and a bifurcated clevis at the opposite end. In assembled relationship to the motorcycle, the clevis of rod 38 engages the mating flanges 36 of collar 34. A bolt passes through mutually aligned holes in the clevis and flanges, and is secured by a nut. The body portion 39 has a hollow shaft section at one end, in alignment with the shank of rod portion 38, and a bifurcated clevis at the opposite end. A nut 40 is fastened, as by welding, to the end of the shaft portion. The threaded shank of the rod 38 is threaded through the nut 40 until the desired length of the link means is reached. A jam nut 41 is threaded up against the nut 40 to insure a locked connection. The excess length of shank is accommodated in the hollow shaft of body portion 39. The bifurcated end of the body portion 39 engages the eye of eye bolt 31. A bolt passes through the bifurcated end of body portion 39 and the eye bolt 31, and is secured in place by a nut.

Linking means of the type described are shown to cooperate with three of the clamps 27 to couple the camper unit of the invention to the motorcycle. Alternate linking structure is shown in FIG. 7. A foorth linking bar links the fourth clamp 27 to the motorcycle. A plate member or mount 44 is fastened to the motorcycle by means of a bolt 45 passing through the plate 44 and threaded into a hole provided in the motorcycle. The mount 44 extends outward from the motorcycle. A fourth linking bar, shown as an elongated rod 43, extends from the fourth of the clamps 27 to the mount 44 on the motorcycle. The rod 43 is bifurcated at both ends and engages at one end the eye of an eye bolt 31 of the clamp 27. The rod 43 extends outwardly therefrom, then is bent 90° downward for a short distance, then is bent again 90° to extend horizontally to the mount 44. The bifurcated end of the rod 43 engages the mount 44 and is secured by a bolt and nut. The length of the link provided by the rod 43 is adjustable by lateral adjustment of the shank portion of the eye bolt 31 disposed within the cylinder 29. The length of links 37 are adjustable relative to each other to provide the wheel 46 with tow in or at a slight converging angle with regard to the wheels of the motorcycle, and to provide the elevating or lowering of a portion of the camper unit.

It may be seen that the hitch assembly as described could be used for transporting a variety of different single wheel side sturctures with a motorcycle, as, for example, a side car for transporting a passenger.

Wheel means for the camper unit include a tire mounted on a wheel 46 rotatably mounted by suitable conventional bearing structure upon a shaft 47. A pair of leaf springs 48, 49 are symmetrically mounted to the bottom of the outside brace member 21 and the outside frame member 17 respectively.

The outside frame member 17 is provided with a pair of longitudinally spaced, downwardly depending front and rear brackets 50, 51 welded to the bottom of the member. Each bracket 50, 5 has a pair of downwardly depending ears 52, 52 having mutually aligned holes. Leaf spring 49 has at either end a horizontal sleeve disposed between the ears 52, 52 of the brackets 50, 51. A nut, secured by a bolt, passes through the ears 52, 52 and the sleeves of the leaf spring, thus holding the leaf spring securely in place. It may be seen that the leaf spring and tire assembly may be readily removed from the frame 13 for replacement by, for example, a sled structure. Likewise, the leaf spring 48 is mounted to the longitudinal brace member 21 by a pair of front and rear brackets 56, 57, in the same fashion that leaf spring 49 is mounted to the outside member 17. V-shaped clamps 53, 53 attached to the leaf spring 48, 49 securely hold the shaft 48 in position relative to the leaf springs. The top of the tire 46 is in horizontal alignment with the top surfaces of the frame members 16 through 21.

The shelter portion of the camper unit includes a rigid floor and a tent adapted to be pitched on the floor. The floor portion is comprised of a plurality of panels, of plywood or like material, hingedly connected as shown in the plan view of FIG. 5 of the floor in the open or erect configuration. The several panels are foldable with respect to one another to form the compact box structure in the closed position, as shown in FIGS. 1 through 3, for transporting. In the box structure there may be contained and transported the tent, tent poles, supporting legs and members and other camping equipment.

As seen by FIG. 5, in the preferred embodiment a middle inboard panel 58 is attached to the top of the frame portion 13 by suitable conventional means such as nuts and bolts, substantially covering the top surface defined by the frame members. An upright side wall 54 is provided adjacent the inboard edge of floor panel 58. Side walls 54, as seen by FIG. 6, is supported by a plurality of upright brace members 55 attached to the inside frame member 16, and extends substantially the length of the frame portion 13.

Middle inboard panel 58 is hingedly connected to the front and rear edges to a front inboard panel 62 and a rear inboard panel 66, respectively. The outside edge of the middle inboard panel is hingedly connected to a middle center panel 59. The outside edge of the front inboard panel 62 is hingedly connected to the inside edge of a front center panel 63. The outside edge of the rear inboard panel 66 is hingedly connected to the inside edge of a rear center panel 67. The outboard edge of middle center panel 59 is hingedly connected to middle outboard panel 60. The front and rear edges of middle outboard panel 60 are hingedly connected to the front outboard panel 64 and rear outboard panel 68, respectively.

Hinged means connecting various floor panels include continuous or piano-type hinges 70 which extend substantially the length of the adjacent edges of the connected panels, although a plurality of smaller, spaced hinges could be used. The hinge means of the invention is best seen by FIG. 4 which illustrates a typical hinge connection between the middle center panel 59 and the middle inboard panel 58, the panel 59 being shown in the closed position and, in phantom, in the open position. The adjacent edges of the panels 58, 59 are provided with elongated grooves 71 approximately midway between the outer surfaces of the panels. The grooves 71 extend substantially the length of the panels. A hinge assembly 70 has hinge plates 73 and 74 pivotally connected by a hinge pin. The hinge plates 73, 74 are accommodated in the grooves 71, 71. The hinge plates are maintained in the groove by suitable fasteners, such as rivets 75, 75. Glue or other fastening means could be used. The edges 77, 78 of the panels 58, 59, respectively, are beveled. In the open position, the lower portions of the edges 77, 78 abut and extend upward diverging from one another to form an upwardly opening V-shaped groove. The center portion of the hinge 70 is accommodated in the V-shaped groove. The abutting portions of the edges 77, 78 provide strength at the hinge connection, yet the hinge is obscured from view.

As seen by FIG. 5, the hinge connections of the front and rear edges of the middle inboard panel 58 to the front and rear inboard panels 62, 66 are staggered relative to the corresponding hinge connections of the outboard panels 60, 64, 68. The floor structure is thus foldable from the open position as shown to the closed configuration in the following manner. Front center panel 63 is folded up 90° with respect to the front inboard panel 62. Rear center panel 67 is folded up 90° with respect to the rear inboard panel 66. The front and rear inboard panels 62, 66 are folded up 90° with respect to the middle inboard panel 58. The middle center panel 59 is then folded up 90° with respect to the middle inboard panel 58. The middle center panel 59 functions as an outer wall of the box-like structure of the camper unit in the folded configuration. Camping gear and equipment, and further structure of the camper unit to be hereinafter described, are then placed in the box now formed. The middle outboard panel 60 is then folded down 90° with respect to the middle center panel 59 to close the top of the box. The front and rear outboard panels fold down 90° with respect to the middle outboard panel to form the front and rear walls of the box. Suitable releasable fastening means, such as snap fasteners, hooks, hasps, or the like (not shown) are provided to maintain the structure in the folded configuration.

In the erected configuration, the floor of the camper unit gains support from a pair of elongated floor support members assembled to removable support stands or legs. As shown in FIG. 8, an elongated tubular floor support member 80 has an end telescopically engaging the open end portion of the lateral rear frame member 19, and extends laterally outward therefrom. The floor support member 80 supports the rearward portions of the center middle panel 59 and the outboard middle panel 60. Support member 80 also has an open end portion. A vertical leg 81 has a horizontal top member 82 which telescopically engages the open end portion of the floor support member 80. The leg 81 extends to the ground and is supported on a flat plate or foot 83. Likewise, there is provided a second tubular floor support member for support of the forward portions of the middle panels, (not shown) which telescopically engages the open end portion of the forward lateral frame member 18. A second leg similar in structure to the leg 81 telescopically engages the end portion of the second floor support member and likewise supports it relative to the ground.

The inboard portion of the floor gains support from a second pair of support stands or legs when the floor is in the erected configuration. Referring to FIG. 9, a leg 86 has a horizontal square-tubular top portion 87 which telescopically engages the open end portion of the L-shaped member 25 engaged in the inside longitudinal frame member 16. The leg 86 extends to the ground and is supported on a foot 88. A like leg (not shown) engages the open end portion of the L-shaped member at the front end of the longitudinal frame member 16. When the leg 86 and the corresponding second leg are assembled to the frame member 16, the motorcycle may be unhitched from the frame for use elsewhere, as said legs provide necessary support for the frame.

For added comfort, as shown by FIG. 4, the floor of the camping portion may be covered by a carpet 89. Adjacent the hinge 74 the carpet has an outwardly directed rib 89A to permit folding of side wall 59.

As may be seen by FIG. 10, the shelter portion of the preferred embodiment is constituted as a tent pitched on a plurality of tent poles over the floor of the camper unit. The tent poles also provide support for the several front and rear floor panels. The tent poles include a pair of center poles 90, a pair of inboard side poles 91, and a pair of outboard side poles 92. Tent pole holes are provided near the outer edges of the various front and rear floor panels to accommodate the tent poles. Each of the front and rear inboard and outboard panels 62, 64, 66, 68 has a hole 94 in the outer corner. Each of the forward and rear center panels 63, 67 has a hole 95 centrally located in proximity to the outer edge of the panel.

A center tent pole 90, as shown in FIG. 11 in assembled relation to the floor, has a hollow tubular base 97 and an insertable shaft 98. Base 97 is supported on the ground by a foot 99, and extends upward through the hole 95 in the floor panel, terminating in an open end above the floor. A circumfrential shoulder 101 is attached, as by welding, to the base 97 just beneath the hole 95. The floor panel rests on and is supported by the shoulder 101. On the lower portion of the shaft 98 there is provided a circumferential flange. The shaft is inserted in the open top end of the base. The flange 102 rests on the top edge of the base 97. The shaft extends upward from the base to the apex of the tent, terminating in conventional tent support means, such as a peg inserted in an eye provided in the apex of the tent.

A side pole 92, as shown by FIG. 12, has a base 103 and a shaft section 104. The base 103 is supported by a foot 105, and has an open top with a circumfential shoulder 106. The shoulder 106 abuts the bottom of the floor panel and supports it. The open end of the base 103 is in alignment with the hole 94 in the floor panel. The lower ends of the shaft 104 is inserted in the open end of the base 103 and rests therein on a suitable shoulder or the like (not shown). The shaft 104 extends upwardly, and terminates in suitable tent support means, such as a peg inserted in an eye provided in a corner of the tent.

As shown by FIG. 10, the tent is pitched on the respective tent poles over the floor of the camper unit. The tent poles also provide support for the floor. The tent 108 is relatively conventional, having side walls connected to slanting roof portions extending upward to an apex. A flap door is provided at one end. Windows and like amenities may also be provided. Guide lines 107 may also be used to maintain the tent in the erected position. The bottom edges of the tent are secured to the floor structure. As shown by FIG. 12, the bottom edge 109 of the tent is lapped and seamed, providing a hem. An elastic cord 110 passes through the hem around the periphery of the tent at the bottom edge. The he of the tent is positioned over the side portions of the floor so that the hem engages the lower edge of the floor structure. The elastic cord biases the hem in the floor engaging position. It is understood that other suitable means could be used to fasten the edge of the tent to the floor structure, such as snaps, hooks, or the like.

The camper unit of the invention is adaptable to be used with other support means, for example it may be adapted to be towed behind a small automobile through the addition of a second wheel means and a trailing tongue, as shown by FIGS. 13 through 15. The hitch bar 23 is removed from the frame 13 by disassembling the L-shaped members 25 from the hitch bar extensions 24. Inside frame member 16 is provided with a pair of longitudinally spaced front and rear brackets, front bracket 112 and a rear bracket (not shown), each having a pair of downwardly depending spaced ears with mutually aligned mounting holes. The brackets 112 and the rear bracket correspond to and are disposed opposite the brackets 50, 51 on the outside frame member 17. The inside brace member 20 is also provided with a pair of longitudinally spaced front and rear brackets, front bracket 116 and a rear bracket (not shown), disposed opposite the front brackets 112 and the rear bracket on inside frame member 16.

Second wheel means includes a wheel 119 having a tire mounted thereon. The wheel 119 is mounted by suitable bearing structure on a shaft 120. A pair of leaf springs 122, 123 are symmetrically mounted to the inside brace member 20 and the inside frame member 16, respectively, by mounting to the front and rear brackets on the inside brace member 20 and the front and rear brackets on the inside frame member 16. The wheel shaft 120 is mounted to the bottom portion of the leaf springs 122, 123 by suitable clamps 124.

Tongue means 126 includes a right tongue arm 127 and a left tongue arm 128. The right tongue is inserted in the open end of the outside frame member 17. The left tongue arm is inserted in the open end of the inside frame member 16. Set screws 129 are threaded through the respective frame members and secure the tongue arms in place. The tongue arms extend outward from the frame members, then diverge and join at a conventinal trailer hitch member 131. The trailer hitch member 131 is adapted to receive a conventional trailer hitch ball. The camper unit may thus be towed conveniently behind a small or conventional size automobile.

The camper unit of the invention may be adapted to be towed behind a snowmobile, as shown by FIGS. 16 through 18, where the camper unit is shown assembled to a sled frame 133. Sled frame 133 includes forward skis 134, 135 on the right and left sides respectively, and rear skis 136, 137 on the right and left sides respectively. Right rear ski 136 has a pair of upwardly projecting parallel ribs 139, 139 attached to opposite ends of a horizontally disposed sleeve 140. The sleeve 140 is positioned between the rear bracket on the inside frame member 16 and the rear bracket on the inside brace member 20, and is in axial alignment with the mounting holes of the brackets. A long bolt 142 secured by a nut passes through the respective brackets and the sleeve 140, to secure the right rear ski to the frame 13. Likewise, the left rear ski 137 has a pair of upwardly projecting ribs 143, 143 attached to opposite ends of a horizontal sleeve 144 positioned between and in axial alignment with the bracket 51 of the outside frame member 17, and the bracket 57 of the outside brace member 21. A bolt, secured by a nut, passes through the sleeve 144 and the respective brackets to secure the ski in place.

The forward skis 134, 135 are connected by a laterally disposed, upwardly curving yoke 146. Forward skis 134, 135 are rigidly secured to the respective ends of the yoke 146. A tongue 147 is fastened to the center of the yoke and extends forwardly therefrom. A Y-shaped bar has rearwardly extending legs 150, 151 and a forward base portion 152. The right leg 150 is rigidly attached to the inside upwardly projecting rib 139 of right rear ski 136. The opposite leg 151 of the Y-shaped bar is rigidly attached to the inside upwardly projecting rib 143 of the left rear ski 137. The forward end of the base portion 152 is pivotally attached to the center of the yoke 146. A generally flat lateral cross bar 154 is securely fastened at the center to the base 152 of the Y-shaped bar 149, and extends laterally therefrom. The ends of the cross bar 154 are bent upwardly to engage the forward bracket 116 on the inside brace member 20, and the forward bracket 56 on the outside brace member 21. The end portions of cross bar 154 are bolted to the respective brackets.

The camper unit 12 is hitched to a snowmobile through a conventional trailer hitch 156 at the end of the tongue 147. The forward skis 134, 135 are steerable through the tongue 147 and the yoke 146, for easy trailing by a snowmobile. The rear skis 136, 137 remain laterally stationary. The camper unit is removable from the sled structure simply by disassembling the rear skis 136, 137 and the cross bar 154 from the respective brackets to which they are secured by removal of the appropriate bolts and nuts.

While there has been shown one embodiment of a sled structure on which the camper unit of the invention maybe be mounted, various other sled structures could be utilized. For example, in the embodiment illustrated in FIGS. 13 through 15, the wheels 146 and 119 could be removed from the shafts 47 and 120. A single elongated ski or runner having a horizontally disposed lateral sleeve could be mounted to the right shaft 46 with the sleeve engaging the shaft. A second ski could likewise be mounted to the left shaft 124. So mounted, the camper unit would then obtain the benefit of the various leaf springs which would not have to be removed.

The camper unit 12 when used as a two wheel trailer or on a sled can be opened into a tent as shown in FIG. 10. Also, a parts or equipment storage box can be attached to the frame to provide an additional area for the tent poles, fishing poles, floor supporting legs, and like structures. This box can be attached to frame members 20 and 21 and extend along the bottom of floor panel 58, for example, as the box 157 shown in phantom in FIG. 8.

It is contemplated that the camper unit of the invention may be used by ice fishermen who fish in the winter through a hole sawed or chopped in the ice of a lake. To this end the camper unit may optionally be provided with a feature whereby in the erected configuration the camper unit may also be used as an ice fishing house as shown in phantom in FIGS. 5 and 8. As shown by FIG. 5, a circular hole 158 is provided in the center middle panel 59. As shown by FIG. 8, an insertable ice fishing tube 160 is inserted through the hole 158. The tube 160 has an elongated tubular cylindrical body portion extending from the floor to a hole in the ice, and a flange portion 161 attached to the tubular portion. Flange portion 161 has an outside diameter larger than the hole 158 and rests on the floor, thus preventing the circulation of cold air from beneath the floor to the interior of the erected camper unit. A suitable cap could be provided to cover the hole 158 when not in use.

I claim:

1. A camper unit convertible from a first erect camping configuration to a second collapsed transporting configuration for transport with a motorcycle, including: a frame; hitch means removably mounted adjacent one side of the frame; said hitch means cooperable with portions of the motorcycle to releasably hitch the frame to a side of the motorcycle; floor means secured to the top of the frame; a fixed upright side wall connected to said frame adjacent the floor means on the same side as the hitch means; said floor means including a plurality of floor panels connected by hinge means unfoldable away from the upright side wall to form a flat floor in the erected configuration and foldable into a box over said frame in the collapsed configuration; said upright side wall forming one wall of said box in the collapsed configuration; shelter means mountable over the floor means in the erect configuration; removable floor support means to support the floor means in the erect configuration; and wheel means mounted on the frame opposite the hitch means.

2. A camper unit convertible from a first erect camping configuration to a second collapsed transporting configuration for transport with a motorcycle, including: a frame; hitch means removably mounted to the frame including an elongated bar removably mounted to the frame; a plurality of clamps slidably engaging said bar; a plurality of linking members; each linking member attached at one end to one of said clamps, and removably attachable at the opposite end to the motorcycle; and means to secure said clamps in fixed selected position relative to said bar; said hitch means cooperable with portions of the motorcycle to releasably hitch the frame to a side of the motorcycle; floor means ecured to the top of the frame; said floor means including a plurality of floor panels connected by hinge means to form a flat floor in the erected configuration and foldable into a box over said frame in the collapsed configuration; shelter means mountable over the floor means in the erect configuration; removable floor support means to support the floor means in the erect configuration; and wheel means mounted on the frame opposite the hitch means.

3. The camper unit of claim 2 wherein said motorcycle has a plurality of tubular members and wherein: at least one collar engages a tubular member of the motorcycle and at least one of the linking members is adjustable in length and includes an elongated rod portion and a mating body portion, said rod portion engaging said collar at one end and having a threaded shank at the other end, said mating body portion engaging one of said clamps at one end and having a hollow tubular portion at the other end with a threaded opening, said shank of the rod portion being threaded into the opening.

4. The camper unit of claim 2 wherein said shelter means includes a plurality of tent poles and a tent pitched on said poles over the floor means in the erect configuration.

5. The camper unit of claim 4 wherein said tent poles are jointed, each having a first portion and a second portion, said first portion extending beneath the floor means and supporting the floor means relative to the ground, and having an open upper end, said second portion telescopically engaging the upper open end of the first portion.

6. A camper unit convertible from a first erect camping configuration to a second collapsed transporting configruation for transport with a mototcycle, including: a frame having a plurality of interconnected frame members including an inside longitudinal frame member, and a front lateral frame member, an outside longitudinal frame member, and a rear lateral frame member; hitch means removably mounted to the frame, including a plurality of clamp means, means movably associating the clamp means with the frame, and link means connecting the clamp means to selected portions of the motorcycle; floor means secured to the top of the frame; said floor means including a plurality of floor panels connected by hinge means to form a flat floor in the erected configuration and foldable into a box over said frame in the collapsed configuration; shelter means mountable over the floor means in the erect configuration; removable floor support means to support the floor means in the erect configuration; a portion of floor support means including a first floor support member having an inside end telescopically engageable with the front lateral frame member, a second floor support member having an inside end telescopically engageable with the rear lateral frame member, a first pair of legs supporting the outer ends of the first floor support member and the second floor support member relative to the ground, and a second pair of legs supporting the end portions of the inside longitudinal frame member; and wheel means mounted on the frame opposite the hitch means.

7. The camper unit of claim 6 wherein: wheel means includes a tire mouned on a wheel, said wheel rotatably mounted to the outside longitudinal frame member, said tire having a top surface in horizontal alignment with the top surface defined by said frame whereby the tire supports a portion of the floor means in the erected configuration.

8. The camper unit of claim 1 wherein said floor means includes: a middle inboard panel secured to the frame; a front inboard panel hingedly connected to the front edge of the middle inboard panel; a rear inboard panel hingedly connected to the rear edge of the middle inboard panel; a middle center panel hingedly connected to the outside edge of the middle inboard panel; a front center panel hingedly connected to the outside edge of the front inboard panel; a rear center panel hingedly connected to the outside edge of the rear inboard panel; a middle outboard panel hingedly connected to the outboard edge of the middle center panel; a front outboard panel hingedly connected to the front edge of the middle outboard panel; and a rear outboard panel hingedly connected to the rear edge of the middle outboard panel.

9. The camper unit of claim 1 wherein said hinge means includes: at least one pair of adjacent floor panels including a first floor panel and a second floor panel connected by a hinge, said hinge having a first hinge plate and a second hinge plate, a hinge pin pivotally connecting the first hinge plate and the second hinge plate, the adjacent edge of at least one of said floor panels being provided with an elongated groove; one of said hinge plates being accommodated in said groove; fastening means retaining said hinge plate in said groove; and means attaching the opposite hinge plate to the other floor panel.

10. The camper unit of claim 9 wherein: the adjacent edge of the second floor panel is provided with an elongated groove and said second hinge plate is accommodated in said groove of the second floor panel.

11. The camper unit of claim 10 wherein: the adjacent edges of the first floor panel and the second floor panel are beveled to provide an upwardly diverging V-shaped groove.

12. A camper unit for transport with a motorcycle including: camper means convertible from a first erect camping configuration to a second collapsed transporting configuration; hitch means cooperable with portions of the motorcycle to connect the camper means to the side of the motorcycle; said hitch means including an elongated hitch bar attached to the camper means, a plurality of clamp means slidably engaging said bar, and link means connecting the clamp means to selected portions of the motorcycle; and wheel means mounted on the camper means opposite the hitch means to rotatably support a portion of the camper means on the ground.

13. The camper unit of claim 12 including rotatable means for adjusting the length of the linking means.

14. A camper unit for transport selectively with an automobile and a motorcycle including: camper means convertible from a first erect camping configuration to a second collapsed transporting configuration; adjustable, removable motorcycle hitch means attached to one side of the camper means; said hitch means cooperable with portions of a motorcycle to connect the camper means to the side of the motorcycle; wheel means mounted on the camper means to rotatably support the camper means; and removable tongue means adapted to be connected to an automobile attachable to the front of the camper means when the hitch means is removed for towing with an automobile.

15. The camper unit of claim 14 wherein: said wheel means are removably mounted on bracket means, said bracket means adapted to receive a sled structure when the wheel means are removed.

* * * * *